United States Patent [19]

Takeda et al.

[11] Patent Number: 4,626,997
[45] Date of Patent: Dec. 2, 1986

[54] METHOD OF AND SYSTEM FOR CONTROLLING IGNITION TIMING RETARD LIMIT IN INTERNAL COMBUSTION ENGINE

[75] Inventors: Yuuji Takeda; Toshio Suematsu; Katsushi Anzai; Yoshiyasu Ito, all of Toyota, Japan

[73] Assignee: Toyota Jidosha Kabushiki Kaisha, Toyota, Japan

[21] Appl. No.: 581,042

[22] Filed: Feb. 17, 1984

[30] Foreign Application Priority Data

Feb. 18, 1983 [JP] Japan .................................. 58-26015

[51] Int. Cl.⁴ .............................................. F02P 5/04
[52] U.S. Cl. ............................... 364/431.05; 123/492; 123/422
[58] Field of Search ............... 123/422, 416, 417, 492; 364/431.03, 431.04, 431.05, 431.07

[56] References Cited

U.S. PATENT DOCUMENTS 3,935,845  2/1976  Aono et al. .......................... 123/422
4,232,642  11/1980  Yamaguchi et al. ................ 123/422
4,256,073  3/1981  Kobashi et al. ..................... 123/422
4,389,997  6/1983  Nakano et al. ...................... 123/492
4,425,890  1/1984  Yamaguchi .......................... 123/422
4,513,716  4/1985  Haraguchi et al. ................. 123/422

FOREIGN PATENT DOCUMENTS 0051954  4/1980  Japan .................................. 123/422

Primary Examiner—Parshotam S. Lall
Attorney, Agent, or Firm—Finnegan, Henderson, Farabow, Garrett & Dunner

[57] ABSTRACT

In the control of an ignition timing retard limit in an internal combustion engine in which an ignition timing is sought from an intake air flowrate and an engine speed, and the ignition timing thus obtained is compared with the retard limit to prevent the ignition timing from being at the retard side beyond the retard limit, during detection of a rapid acceleration, the aforesaid retard limit is moved to the advance side to prevent the ignition timing from being over-retarded during the rapid acceleration.

10 Claims, 11 Drawing Figures

METHOD OF AND SYSTEM FOR CONTROLLING IGNITION TIMING RETARD LIMIT IN INTERNAL COMBUSTION ENGINE

BACKGROUND OF THE INVENTION

1. Field of the Invention

This invention relates to a method of and a system for controlling an ignition timing retard limit in an internal combustion engine ignition control apparatus, and more particularly to improvement in a method of and a system for controlling an ignition timing retard limit suitable for use in an a motor vehicle having an electronic controlled engine ignition timing control system, seeking ignition timing from an intake air flowrate and an engine speed, and comparing the ignition timing with the retard limit to prevent the ignition timing from being on the retard side beyond the retard limit.

2. Description of the Prior Art

Heretofore, it has been known that, in a spark-ignition internal combustion engine, the ignition timing is closely related to the output performance and fuel consumption performance of the engine. Consequently, there has been put in practical use a so-called electronic controlled ignition timing control system, wherein, in order to steadily control to the optimal ignition timing in accordance with the operating conditions of the engine, the ignition timing is sought from an engine load such as an intake air flowrate and an engine speed to control the actual ignition timing for obtaining the optimal ignition timing.

In the electronic controlled ignition timing control system of the type described, when the engine load is detected from the intake air flowrate, an air flow meter of flap type generally is used to measure the intake air flowrate. With the air flow meter of this flap type, a measured flowrate of intake air excessively larger than the actual flowrate of intake air can occur after the rapid opening operation of a throttle valve due to the increase in the flowrate of intake air during rapid acceleration. In the aforesaid electronic controlled ignition timing control system, generally the higher side of load, where the measured flowrate of intake air is increased, is selected, the more the ignition timing is retarded. Hence, there exits in such prior art systems the disadvantage that the ignition timing is temporarily over-retarded due to the above phenomenon, whereby the output performance becomes insufficient and the fuel consumption performance is deteriorated.

To obviate the above-described disadvantages, there has been proposed to temporarily advance the ignition timing after rapid acceleration. However, since it is necessary to avoid knocking immediately after the acceleration, the control operations have to be able to compensate for the fact that the ignition timing can be over-advanced after the measured flowrate of intake air has come into agreement with the actual flow rate, thus presenting a possibility of causing knocking.

SUMMARY OF THE INVENTION

The present invention has been developed to obviate the above-described disadvantages of the prior art and has as its first object the provision of a method of controlling an ignition timing retard limit in an internal combustion engine, wherein the over-retard in the ignition timing during rapid acceleration, where an air flow meter erroneously outputs an indication of an excessively large volume of intake air, can be avoided, so that an output performance drop of the engine can be prevented to secure the acceleration performance and improved fuel consumption performance.

The present invention has as its second object the provision of method of controlling an ignition timing retard limit in an internal combustion engine, capable of readily detecting the aforesaid rapid acceleration without using a separate sensor.

The present invention has as its third object the provision of method of controlling an ignition timing retard limit in an internal combustion engine, capable of reliably avoiding the knocking due to the over-advance during high speed rotation of the engine.

The present invention has as its fourth object the provision of a method of controlling an ignition timing retard limit in an internal combustion engine, capable of reliably achieving the aforesaid third object.

The present invention has as its fifth object the provision of a method of controlling an ignition timing retard limit in an internal combustion engine, capable of minimizing the knocking during rapid acceleration.

The present invention has as its sixth object the provision of a method of controlling an ignition timing retard limit in an internal combustion engine, wherein a proper retard limit is set.

The present invention has as its seventh object the provision of a system for controlling an ignition timing retard limit in an internal combustion engine, capable of achieving the first object.

The present invention has as its eighth object the provision of a system for controlling an ignition timing retard limit in an internal combustion engine, provided with a throttle sensor capable of readily achieving the second object.

The present invention has as its ninth object the provision of a system for controlling an ignition timing retard limit in an internal combustion engine, capable of achieving both of the first and third objects.

To achieve the first object, the present invention contemplates that a method of controlling an ignition timing retard limit in an internal combustion engine, the technical gist of which is shown in FIG. 1, comprises:

a step of determining an ignition timing from an intake air flowrate and an engine speed;

a step of detecting rapid acceleration;

a step of moving the retard limit to the advance side, that is, in the direction for advancing the ignition timing to decrease the amount by which the ignition timing can be retarded, at the time of detecting a rapid acceleration; and a step of comparing the ignition timing with the retard limit to prevent the ignition timing form being on the retard side beyond the retard limit.

To achieve the second object, the present invention contemplates that, in a method of controlling an ignition timing retard limit in an internal combustion engine, the rapid acceleration is detected from the occurence of the opening of the throttle valve being changed a predetermined value within a preset period of time.

To achieve the third object, the present invention contemplates that, in a method of controlling an ignition timing retard limit in an internal combustion engine, during the detection of rapid acceleration, the retard limit is moved to the advance side only when the engine speed is less than a predetermined value.

To achieve the fourth object, the present invention contemplates that, in a method of controlling an ignition timing retard limit in an internal combustion engine, the predetermined value of the engine speed is set at 1500 rpm.

To achieve the fifth object, the present invention contemplates that, in a method of controlling an ignition timing retard limit in an internal combustion engine, the retard limit during the detection of rapid acceleration is set slightly to the retard side beyond the ignition advance setting at low load.

To achieve the sixth object, the present invention contemplates that, in a method of controlling an ignition timing retard limit in an internal combustion engine, the retard limit during normal operations is set at 5° BTDC and the retard limit at the time of the rapid acceleration is set at 15° BTDC.

To achieve the seventh object, the present invention contemplates that a system for controlling an ignition timing retard limit in an internal combustion engine comprises:

an air flow meter for detecting an intake air flowrate;

a throttle sensor for sensing the opening of a throttle valve and a rate of change thereof;

spark plugs for igniting an air-fuel mixture introduced into combustion chambers of the engine;

an igniter for generating a primary ignition signal;

an ignition coil for converting the primary ignition signal generated in the igniter into a secondary ignition signal of high voltage;

a distributor for distributing the secondary ignition signal generated in the ignition coil to the spark plugs in respective cylinders;

a cylinder discriminating sensor and a crank angle sensor, which are incorporated in the distributor, for emitting a cylinder discrimination signal and a crank angle signal, respectively; and an electronic control unit for computing a basic ignition timing from the intake air flowrate measured by the air flow meter and the engine speed detected from the output of the crank angle sensor, comparing the basic ignition timing with the retard limit, the retard limit being adapted to be moved in the advance direction during detection of rapid acceleration and emitting an ignition command signal to the igniter in a manner to prevent the ignition timing from exceeding the retard limit in the retard direction, that is, in the direction for retarding ignition timing.

To achieve the eighth object, the present invention contemplates that the throttle sensor comprises:

a movable contact rotatable in association with the throttle valve;

an idle contact provided at a position corresponding to the fully closed position of the throttle valve, for sensing the throttle valve being in the fully closed condition; and a pair of cooperating comb-shaped contacts mutually combinedly provided, for detecting the rate of change in opening of the throttle valve.

To achieve the ninth object, the present invention contemplates that a system for controlling an ignition timing retard limit in an internal combustion engine comprises:

the aforesaid air flow meter;
the aforesaid throttle sensor;
the aforesaid spark plugs;
the aforesaid igniter;
the aforesaid ignition coil;
the aforesaid distributor;
the aforesaid cylinder discrimination sensor and crank angle sensor; and an electronic control unit for seeking a basic ignition timing from the flowrate of intake air emitted from the air flow meter and the engine speed detected from the crank angle sensor, comparing the basic ignition timing with the retard limit, the retard limit being adapted be moved in the advance direction during detection of a rapid engine acceleration, the retard limit being moved only when the engine speed is less than a predetermined value, and emitting an ignition command signal to the igniter in a manner to prevent the ignition timing from exceeding the retard limit in the retard direction.

According to the present invention, the retard limit of the ignition timing is moved in the advance direction at the time of a rapid engine acceleration to compensate for the air flow meter tending to erroneously, temporarily output a signal showing an excessively high flowrate of intake air, so that the over-retard in ignition timing can be precluded, an output performance drop in the engine can be prevented to secure the acceleration performance, and the fuel consumption performance can be improved.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the embodiments of the engine of a motor vehicle provided with an intake air flowrate/sensing type electronic control device, to which is applied the method of controlling an ignition timing retard limit in an internal combustion engine according to the present invention.

Figure 1:
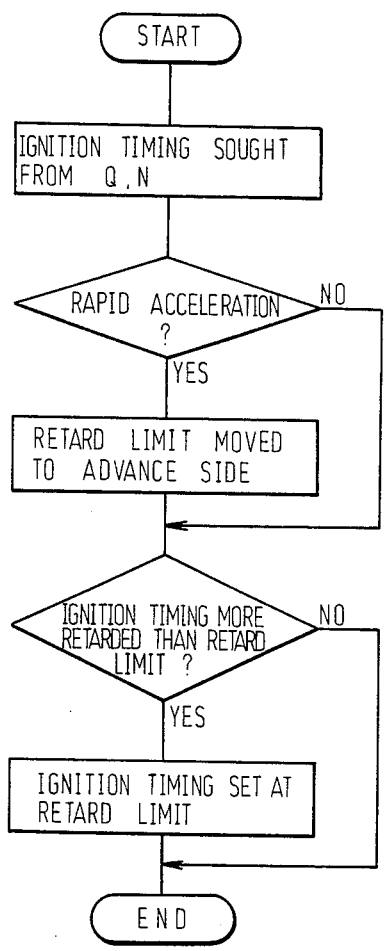
FIG. 1 is a flow chart showing the gist of the method of controlling an ignition timing retard limit in an internal combustion engine according to the present invention.
Figure 2:
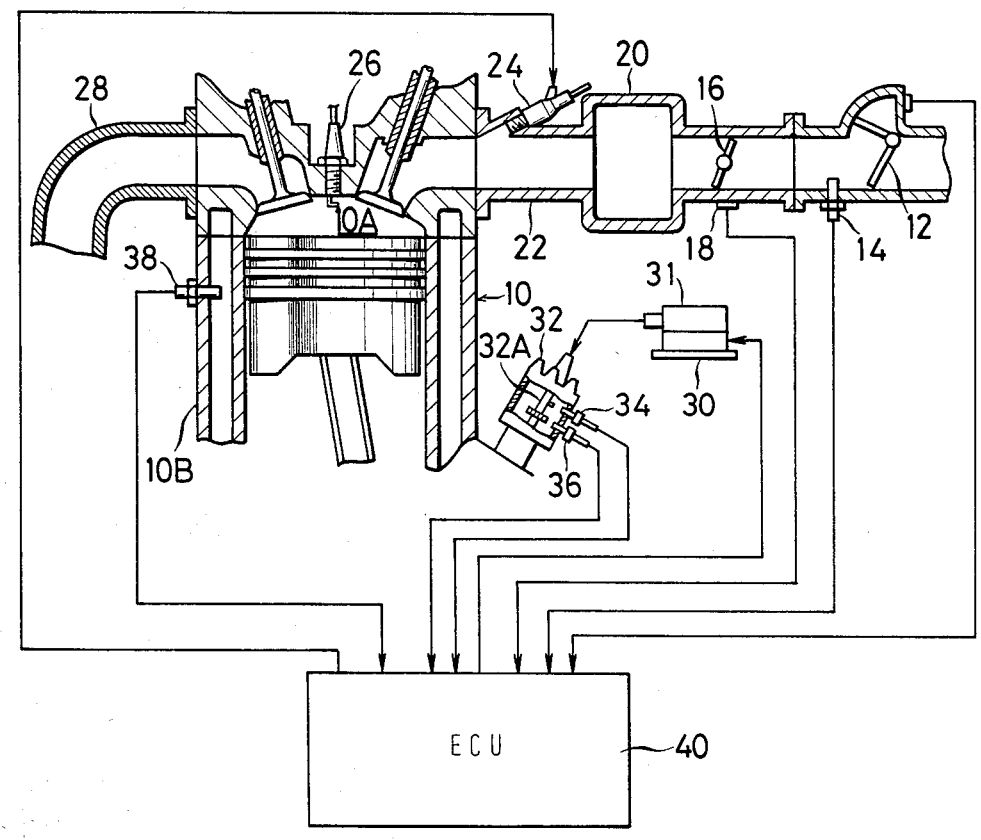
FIG. 2 is a sectional view, partially including a block diagram, showing the general arrangement of a first embodiment of an engine for a motor vehicle, provided with an intake flowrate sensing type electric control device, to which the present invention is applied.

As shown in FIG. 2, the first embodiment of the present invention comprises:

a flap type air flow meter 12 for detecting an intake air flowrate;

an intake air temperature sensor 14 incorporated in the air flow meter, for detecting the temperature of intake air;

a throttle valve 16 to be opened or closed in association with an accelerator pedal, not shown, provided at a driver's seat, for controlling the flowrate of intake air;

a throttle sensor 18 for sensing the opening degree of the throttle valve 16 and a rate of change thereof;

a surge tank 20 for preventing intake interference;

injectors 24 provided on an intake manifold 22, for injecting pressurized fuel to intake ports of respective cylinders;

spark plugs 26 for igniting the air-fuel mixture introduced into combustion chambers 10A of the engine;

an exhaust manifold 28;

an igniter 30 for generating a primary ignition signal;

an ignition coil 31 for converting the primary ignition signal generated in the igniter 30 into a secondary ignition signal of high voltage;

a distributor 32 having a distributor shaft 32A rotatable in association with a crankshaft of the engine 10, for distributing the secondary ignition signal generated in the ignition coil 31 to the spark plugs 26 in the respective cylinders;

a cylinder discriminating sensor 34 and a crank angle sensor 36, both of which are incorporated in the distributor 32, for emitting a cylinder discrimination signal and a crank angle signal, respectively;

a water temperature sensor 38 provided on a cylinder block 10B, for sensing engine coolant temperature; and an electronic control unit (hereinafter referred to as an "ECU") 40 for determining a basic ignition time $\theta$ base from an intake air flowrate Q sensed from an output of the air flow meter 12 and an engine speed N sensed from an output of the crank angle sensor 36, comparing the basic ignition timing $\theta$ base with a retard limit $\theta$ min to be moved in the advance direction when rapid acceleration is detected, emitting an ignition command signal to the igniter 30 so as to prevent the ignition timing from exceeding the retard limit $\theta$ min in the retard direction, determining a fuel injection amount in accordance with an intake air flowrate, engine speed, engine coolant temperature and the like and emitting a valve-opening time signal to the injector 24.

Figure 3:
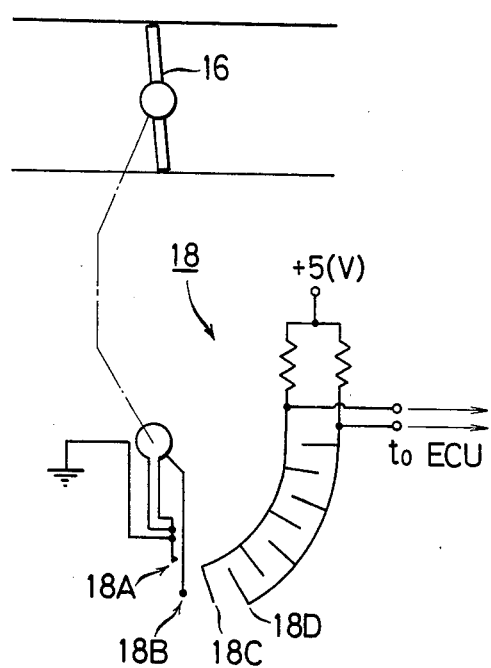
FIG. 3 is a circuit diagram showing the arrangement of a throttle sensor used in the first embodiment.

As detailedly shown in FIG. 3, the throttle sensor 18 comprises:

a movable contact 18A rotatable in association with the throttle valve 16;

an idle contact 18B provided at a position corresponding to the fully closed position of the throttle valve 16, for sensing when the throttle valve 16 is in the fully closed condition; and a pair of cooperating comb-shaped contacts 18C and 18D mutually combinedly provided, for detecting the rate of change in the opening of the throttle valve 16.

Figure 4:
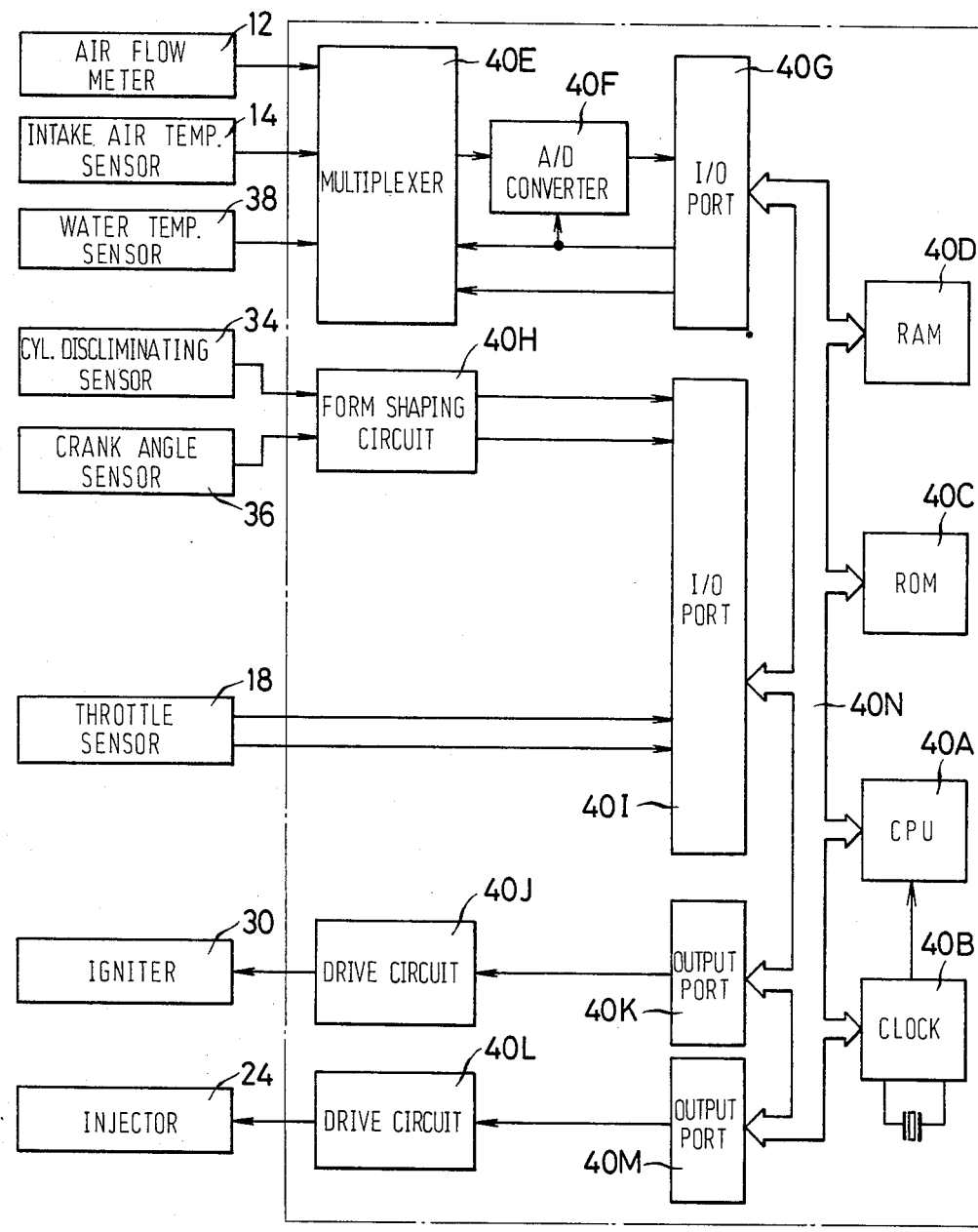
FIG. 4 is a block diagram showing the arrangement of an electric control unit used in the first embodiment.

As detailedly shown in FIG. 4, the ECU 40 comprises:

a central processing unit (hereinafter referred to as a "CPU") 40A comprising a microprocessor for example, for performing various calculation processes;

a clock 40B for generating various clock signals;

a read only memory (hereinafter referred to as a "ROM") 40C for previously storing a control program, various data and the like;

a randam access memory (hereinafter referred to as a "RAM") 40D for temporarily storing calculation data in the CPU 40A and the like;

a multiplexer 40E for successively receiving analong signals such as an output from the air flow meter 12, an output from the intake air temperature sensor 14, and an output from the water temperature sensor 38;

an analog/digital converter (hereinafter referred to as an "A/D converter") 40F for converting an output from the multiplexer 40E into a digital signal;

an input/output port (hereinafter referred to as an "I/O port") 40G for receiving an output from the A/D converter 40F;

a form shaping circuit 40H for wave-form shaping outputs form the cylinder discriminating sensor 34 and the crank angle sensor 36;

an I/O port 40I for receiving outputs from the form shaping circuit 40H and the throttle sensor 18;

an output port 40K for emitting an ignition command signal to the igniter 30 through a drive circuit 40J in accordance with the result of calculation in the CPU 40A;

an output port 40M for emitting a valve-opening time signal to the injectors 24 through a drive circuit 40L in accordance with the result of calculation in the CPU 40A; and a common bus 40N for connecting the above-described components to one another.

Description will now be given of the operation of the above described system.

Figure 5:
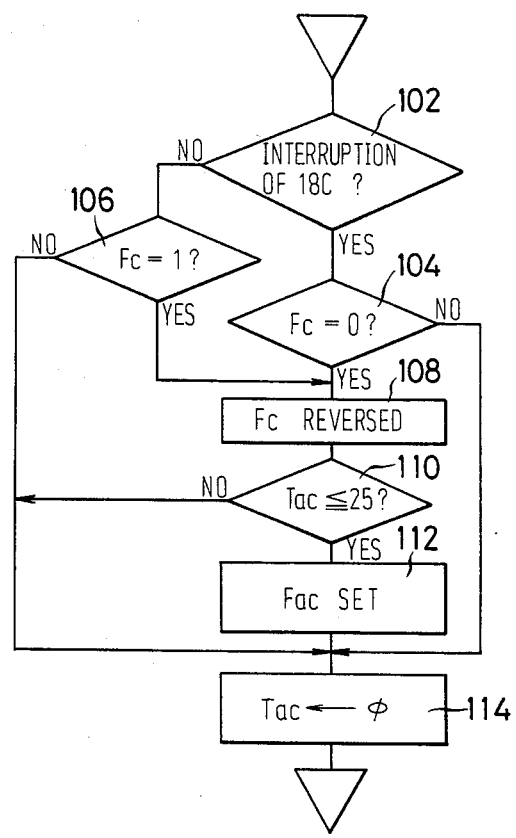
FIG. 5 is a flow chart showing the interrupt routine entered upon by an increase in the output signal from the comb-shaped contacts of the throttle sensor, for detecting a rapid acceleration, used in the first embodiment.

The detection of a rapid acceleration in this embodiment is performed by an interrupt routine as shown in FIG. 5, which is entered following an increased output signal from the comb-shaped contacts 18C and 18D of the throttle sensor 18. More specifically, following an increased output of the comb-shaped contact 18C or 18D, the routine proceeds to Step 102, where it is judged whether the interruption is due to an increase in the output signal from the comb-shaped contact 18C or not. If the result of the judgment is positive, the routine proceeds to Step 104, where it is judged whether or not to reset flag Fc indicating that the preceding interruption is an interruption due to an increase in the output signal of the comb-shaped contact 18C. On the other hand, when the result of judgment in the aforesaid Step 102 is negative, i.e., the interruption this time is an interruption due to a rise of an output of the comb-shaped contact 18D, the routine proceeds to step 106 where it is judged if the flag Fc is set or not.

Figure 7:
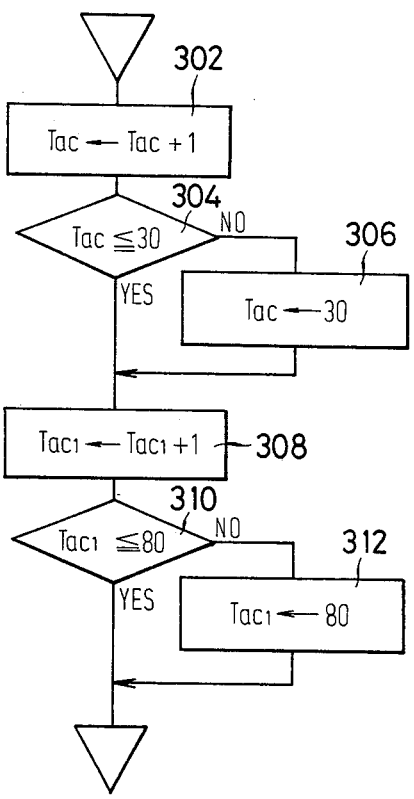
FIG. 7 is a flow chart showing a 4-millisec interrupt routine for counting up a counter used in the first embodiment.

When the result of the judgment in Step 104 or 106 is positive, i.e., it is judged that the opening of the throttle valve 16 is changed, exceeding a predetermined value, the routine proceeds to Step 108, where the Flag Fc is reversed to be ready for the subsequent judgment. Subsequently, the routine proceeds to Step 110, where judgment is made if the counted number in a counter Tac, in which one up-count is made per 4 millisec, by a 4 millisec interrupt routine as shown in FIG. 7 to be described hereinafter, is less than a predetermined number, 25 for example. When the result of the judgment is positive, i.e., it is judged to be the case of a rapid acceleration where the opening of the throttle valve 16 is changed, exceeding a predetermined value, within a predetermined period of time, e.g., 100 millisec, the routine proceeds to Step 112, where a flag Fac indicating the case of rapid acceleration is set. After the completion of Step 112, or the results of the judgment in Steps 104, 106 or 110 is negative, the routine proceeds to Step 114, where the counter Tac is cleared, whereby the interrupt routine is completed and a return is made to the main routine.

Figure 6:
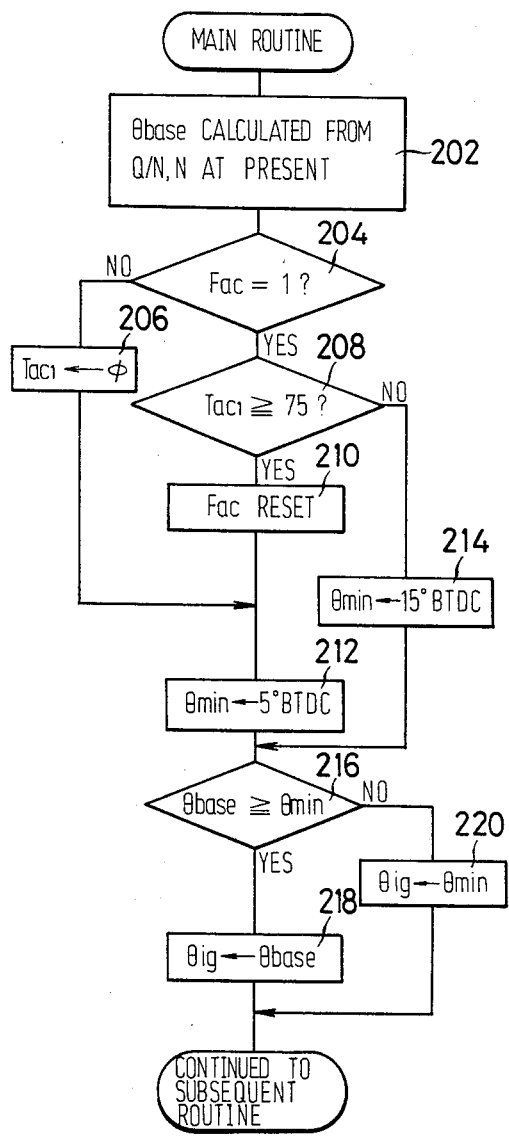
FIG. 6 is a flow chart showing the essential portions of a main routine for determining a final ignition timing used in the first embodiment.

The determination of the ignition timing in accordance with the presence or absence of a rapid acceleration, which is detected in the interrupt routine as shown in FIG. 5, is performed, following a routine in the main routine as shown in FIG. 6. More specifically, in Step 202, the basic ignition timing $\theta$ base is calculated from an intake air flowrate Q/N for each revolution of the engine and an engine speed N also is calculated at that time. Subsequently, the routine proceeds to Step 204, where it is judged whether the flag Fac indicating the detection of a rapid acceleration is set or not. When the result of the judgment is negative, i.e., no rapid acceleration is detected, the routine proceeds to Step 206, where a counter $Tac_1$ detecting a lapse of a period of time after the detection of rapid acceleration is cleared.

On the other hand, when the result of the judgment in the aforesaid Step 204 is positive, i.e., it is judged that a rapid acceleration is present, the routine proceeds to Step 208, where it is judged whether a counted number in the counter $Tac_1$ exceeds predetermined value, 75 for example. When the result of judgment is positive, i.e., after a lapse of 300 millisec or more upon detection of a rapid acceleration, the routine proceeds to Step 210, where the flag Fac indicating the detection of rapid acceleration is reset. Upon completion of Step 206 or 210, the routine proceeds to Step 212, where the retard limit $\theta$ min of the ignition timing is set at a normal value, 5° BTDC for example. On the other hand, when the result of the judgment in the aforesaid Step 208 is negative, i.e., a lapse of a period of time after the detection of a rapid acceleration is less than 300 millisec, the routine proceeds to Step 214, where the retard limit $\theta$ min is moved in the advance direction to an ignition timing slightly less (that is, on the retar side from) the advance timing setting for low load, that is, moved to 15° BTDC for example. Upon completion of Step 212 or 214, the routine proceeds to Step 216, where it is judged whether the basic ignition timing $\theta$ base sought in the aforesaid Step 202 exceeds the retard limit $\theta$ min or not. When the result of the judgment is positive, the routine proceeds to Step 218, where the basic ignition timing $\theta$ base is adopted as the final ignition timing designated $\theta$ ig. On the other hand, when the result of the judgment in the aforesaid Step 216 is negative, i.e., the basic ignition timing $\theta$ base is on the retard side beyond the retard limit $\theta$ min, the routine proceeds to Step 220, where the retard limit $\theta$ min is adopted as the final ignition timing $\theta$ ig. Upon completion of Step 218 or 220, the process proceeds to a subsequent routine in the main routine.

Count-ups in the counters Tac and $Tac_1$ used in the routines as shown in FIGS. 5 and 6 are performed by a 4 millisec interrupt routine as shown in FIG. 7. More specifically, each time after a lapse of 4 millisec, the routine proceeds to Step 302, where the counter Tac is counted up by one. Subsequently, the routine proceeds to Step 304, where it is judged whether the counted number in the counter Tac is less than the upper limit 30 or not. When the result of judgment is negative, i.e., the counted number in the Counter Tac is judged to be abnormal, the routine proceeds to Step 306, where the upper limit 30 enters the counter Tac. Upon completion of Step 306 or when the result of judgment in the aforesaid Step 304 is positive, the routine proceeds to Step 308, where the counter $Tac_1$ is counted up by one. Subsequently, the routine proceeds to Step 310, where it is judged whether the counted number in the counter $Tac_1$ is less than the upper limit 80 or not. When the result of the judgment is negative, i.e., the counted number in the counter $Tac_1$ is judged to be abnormal, the routine proceeds to Step 312, where the upper limit 80 enters the counter $Tac_1$. Upon completion of Step 312 or when the result of the judgment in the aforesaid Step 310 is positive, this routine is completed and a return is made to the main routine.

Figure 8:
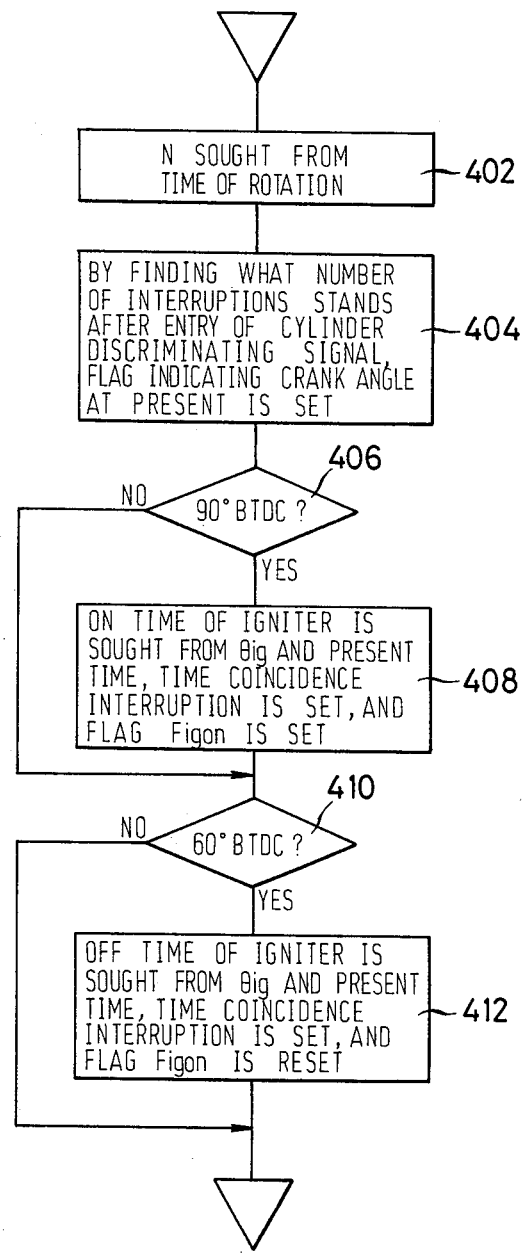
FIG. 8 is a flow chart showing a 30°CA (crank angle) interrupt routine for seeking ON time and OFF time of the igniter used in the first embodiment.

The control of the ignition timing in accordance with the ignition timing $\theta$ ig determined by the routine shown in FIG. 6 is performed in accordance with a 30° CA interrupt routine as shown in FIG. 8. More specifically, the routine proceeds to Step 402 determined every 30° CA and the engine speed N is thought based on the lapse of time between the crank angle signals emitted from the crank angle sensor 36. Subsequently, the routine proceeds to Step 404, where, by finding what number of interruptions stands after the entry of a cylinder discrimination signal emitted from the cylinder discriminating sensor 34, a flag indicating the presently crank angle is set. Subsequently, the routine proceeds to Step 406, where it is judged whether or not the interruption this time is an interruption corresponding to 90° BTD crank angle. When the result of the judgment is positive, the routine proceeds to Step 408, where a time where the ignition 30 is to be turned ON is sought from the final ignition timing $\theta$ ig and the present time, a time coincidence interruption is set and an ignition on flag designated "Figon" in the Figures is set. Furthermore, when the result of the judgment in the aforesaid Step 406 is negative, the routine proceeds to Step 410, where it is judged whether or not the interruption this time is an interruption corresponding to a 60° BTDC crank angle. When the result of judgment is positive, the routine proceeds to Step 412, where a time where the igniter 30 is to be turned OFF is sought from the final ignition timing $\theta$ ig and the present time, a time coincidence interruption is set and the ignition flag Figon is reset. Upon completion of Step 412 or when the result of the judgment in the aforesaid Step 410 is negative, this routine is completed and a return is made to the main routine.

Figure 9:
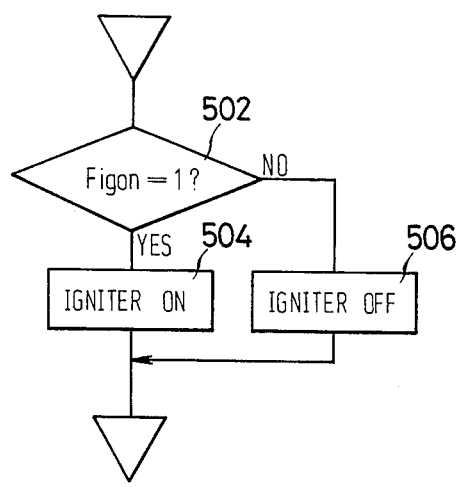
FIG. 9 is a flow chart showing a time coincidence interrupt routine for ON-OFF operating the igniter used in the first embodiment.

ON-OFF operation of the igniter 30 in accordance with the time coincidence interruption set in the interrupt routine of 30° CA as shown in FIG. 8 is performed in accordance with a time coincidence interrupt routine as shown in FIG. 9. More specifically, upon a time coincidence, the routine proceeds to Step 502, where it is judged whether the igniter on flag Figon is set or not. When the result of the judgment is positive, the routine proceeds to Step 504, where the igniter 30 is turned ON, and a return is made to the main routine.

On the other hand, when the result of the judgment in the aforesaid Step 502 is negative, the routine proceeds to Step 506, where the igniter 30 is turned OFF, and a return is made to the main routine.

Figure 10:
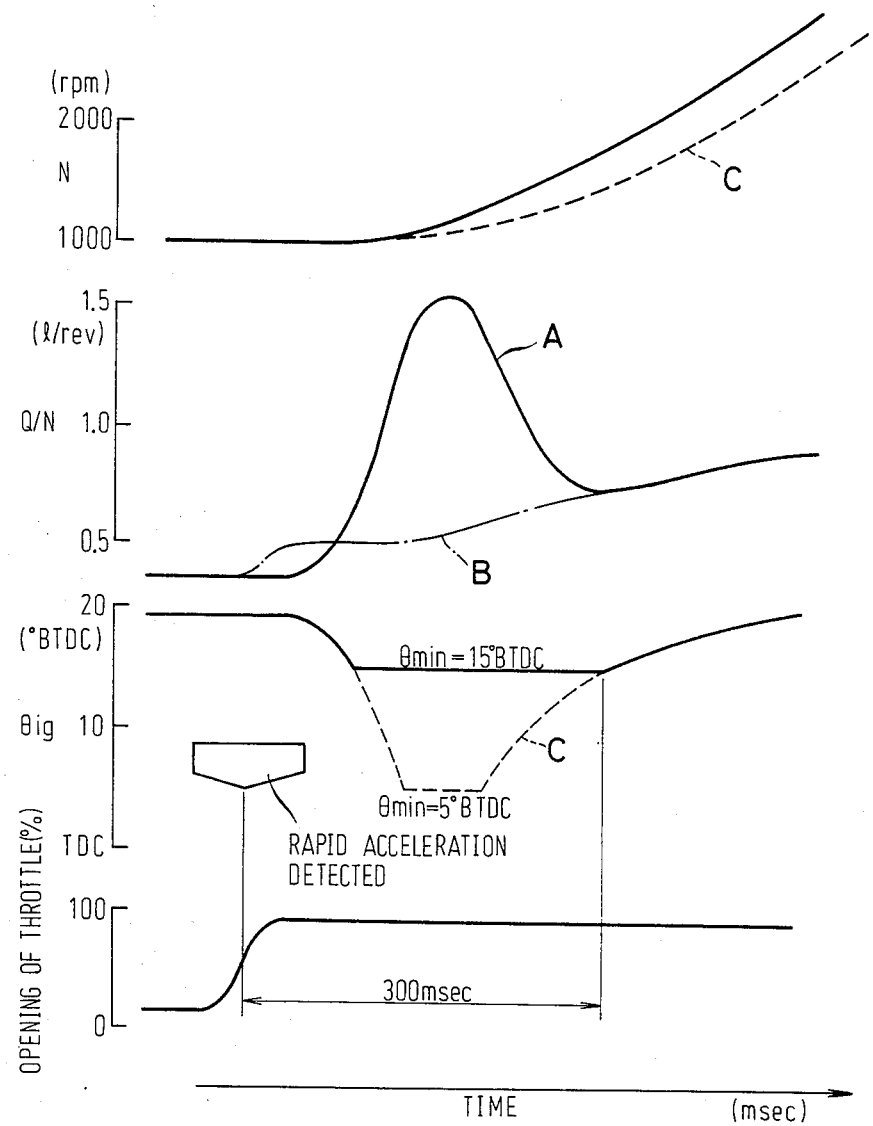
FIG. 10 is a chart showing the comparison between the first eabodiment and the prior art during rapid acceleration, in engine speed, intake air flowrate per turn of the engine, final ignition timing and change of throttle opening.

FIG. 10 shows an example of the comparison of an engine speed N, an intake air flowrate signal Q/N (indicated by a solid line A) per turn of the engine, which is obtained from an output of the air flow meter, actual intake air flowrate Q/N (indicated by a one-dot chain line B) per turn of the engine, the final ignition timing $\theta$ ig and the opening degree of the throttle in this embodiment at the time of a rapid acceleration. It is apparent that, as compared with an example of the prior art also indicated by a broken line C in FIG. 10 for the purpose of comparison, the rise of the engine speed is quickened and a satisfactory acceleration performance is obtained.

A detailed description will now be given of the second embodiment of the present invention.

Similarly to the preceding first embodiment, according to this embodiment, in the engine 10 for a motor vehicle, provided with the intake air flowrate sensing type electronic control device comprising the flap-type air flow meter 12, the intake air temperature sensor 14, the throttle sensor 18, the injectors 24, the spark plugs 26, the igniter 30, the ignition coil 31, the distributor 32, the cylinder discriminating sensor 34, the crank angle sensor 36, the water temperature sensor 38, the ECU 40 and the like, the retard limit $\theta$ min is moved in the advance direction in the ECU 40 only when the engine speed N is less than a predetermined value, 1500 rpm for example, at the time of the detection of a rapid acceleration. Other points are similar to those in the first embodiment, so that detailed description will be omitted.

Description will hereunder be given of action of the second embodiment.

Figure 11:
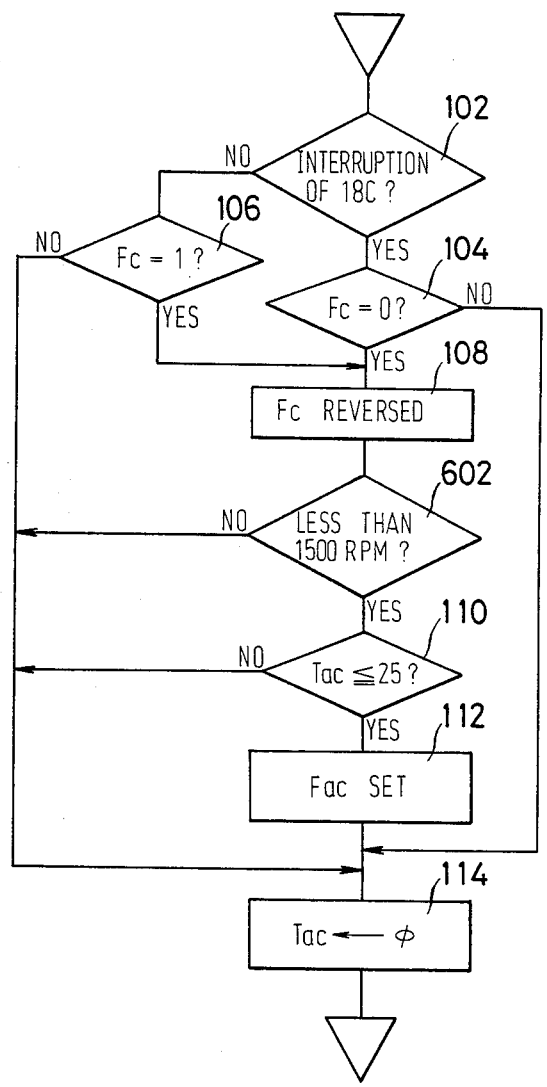
FIG. 11 is a flow chart showing an interrupt routine which is entered upon by an increase in the output signal from the comb-shaped contacts of the throttle sensor, for detecting a rapid acceleration as used in a second embodiment of the method of controlling an ignition timing retard limit in an internal combustion engine according to the present invention.

FIG. 11 shows an interrupt routine which is entered upon an increase in the output signal from the comb-shaped contacts 18C and 18D of the throttle sensor 18 in this embodiment. This interrupt routine is similar to that shown in FIG. 5, but with Step 602 inserted between Steps 108 and 110, and only when in Step 602 it is judged the engine speed N is less than a predetermined value, 1500 rpm for example, the routine proceeds to Step 110, where a rapid acceleration detected flag Fac is set. Other points and other routines are similar to those in the first embodiment, so that description will be omitted.

According to this embodiment, when the engine speed is high and knocking tends to occur in the case where the retard limit $\theta$ min is raised, the present application is not applied. In consequence, the retard limit $\theta$ min in the region of low engine speed, where the effects of the present invention is high, can be further raised, so that the advantage of the present invention can be further improved. In addition, when the engine speed is more than a predetermined value, 1500 rpm for example, as in the second embodiment, the retard limit $\theta$ min can be reduced continuously in accordance with the engine speed, so that the advantage can be further enhanced.

It should be apparent to those skilled in the art that the above-described embodiments are merely representative of the applications of the principles of the present invention. Numerous and varied other arrangements can be readily devised by those skilled in the art without departing from the spirit and the scope of the invention.

What is claimed is:

1. Method of controlling an ignition timing retard limit in an internal combustion engine ignition control apparatus of the type wherein ignition timing is determined from an intake air flowrate measurement and an engine speed measurement, and wherein the ignition retard limit prevents the determined ignition timing from exceeding the value of the limit in the retard direction, the method comprising:
   a step of detecting the onset of engine acceleration above a predetermined value denoting rapid acceleration;
   a step of moving the retard limit in the advance direction at the time of detecting said rapid acceleration; and
   a step of comparing the ignition timing with the moved retard limit prevent said ignition timing from exceeding the moved retard limit in the retard direction.

2. Method of controlling an ignition timing retard limit in an internal combustion engine as set forth in claim 1, wherein means are provided for sensing the degree of opening of the engine throttle valve, and wherein the step of detecting said rapid acceleration includes the step of determining whenever the opening of the throttle valve is changed over a predetermined value within a preset period of time.

3. Method of controlling an ignition timing retard limit in an internal combustion engine as set forth in claim 1, wherein the retard limit is moved in the advance direction only when the engine speed is less than a predetermined value during the detection of said rapid acceleration.

4. Method of controlling an ignition timing retard limit in an internal combustion engine as set forth in claim 3, wherein said predetermined value of the engine speed is set at 1500 rpm.

5. Method of controlling an ignition timing retard limit in an internal combustion engine as set forth in claim 1, wherein the ignition control apparatus includes a preselected advance timing setting for low load operation, and wherein during the detection of said rapid acceleration, said retard limit is moved in the advance direction to a position slightly to the retard side of said advance timing setting at low load.

6. Method of controlling an ignition timing retard limit in an internal combustion engine as set forth in claim 1, wherein the retard limit is set at 5° BTDC except that the retard limit at the time of detecting said rapid acceleration is moved to 15° BTDC.

7. System for controlling ignition timing in an internal combustion engine comprising:
   an air flow meter for detecting an intake air flow rate and emitting a signal representative thereof;
   means for detecting the onset of engine acceleration;
   spark plugs for igniting an air-fuel mixture introduced into combustion chambers of the engine;
   means for generating a primary ingition signal;
   an ignition coil for converting the primary ignition signal into a secondary ignition signal of high voltage;
   a distributor for distributing the secondary ignition signal to spark plugs in respective cylinders;
   a cylinder discriminating sensor and a crank angle sensor for emitting a cylinder discrimination signal and a crank angle signal, respectively; and
   an electronic control unit including means for determining a basic ignition timing from said intake air flowrate signal emitted from said air flow meter and the engine speed determined from said crank angle signal, said electronic control unit having retard limit and means for comparing said basic ignition timing with the retard limit and emitting an ignition command signal to said primary ignition signal generating means in a manner to prevent the ignition timing from being beyond the retard limit in the retard direction, and said electronic control unit further including means for ascertaining the onset of engine accleration exceeding a predetermined value denoting rapid acceleration and for moving said retard limit in the advance direction upon ascertainment of said rapid acceleration.

8. System for controlling ignition timing in an internal combustion engine as set forth in claim 7, wherein said throttle sensor comprises:
   a movable contact rotatable in association with said throttle valve;
   an idle contact provided at a position corresponding to the fully closed position of the throttle valve, for sensing said throttle valve being in the fully closed condition; and
   a pair of cooperating comb-shaped contacts for detecting the rate of change in the opening of said throttle valve.

9. System for controlling ignition timing in an internal combustion engine having a throttle valve, the system comprising:
   a flap-type air flow meter for detecting an intake air flow rate and emitting a signal representative thereof;
   a throttle sensor for sensing the opening of a throttle valve and a rate of change of said opening and providing respective signals thereof;
   spark plugs for igniting air-fuel mixture introduced into combustion chambers of the engine;
   an igniter for generating a primary ignition signal;
   an ignition coil for converting the primary ignition signal generated in said igniter into a secondary ignition signal of high voltage;
   a distributor for distributing said secondary ignition signal generated in said ignition coil to spark plugs in respective cylinders;
   a cylinder discriminating sensor and a crank angle sensor, both being incorporated in the distributor, for emitting a cylinder discrimination signal and a crank angle signal, respective; and
   an electronic control unit including means for determining a basic ignition timing from said intake air flowrate signal emitted by said flap-type air flow meter and the engine speed determined from said crank angle signal, said electronic control unit having a retard limit and means for comparing said basic ignition timing with the retard limit and emitting an ignition command signal to said igniter in a manner to prevent the ignition timing from being beyond the retard limit in the retard direction, and
   said electronic control unit further including means for ascertaining from said throttle opening signal and said rate of change of throttle opening signal, the onset of engine acceleration exceeding a predetermined value denoting rapid acceleration and for moving said retard limit in the advance direction upon ascertainment of said rapid acceleration, said retard limit being moved only when the engine speed is less than a predetermined value.

10. System for controlling ignition timing in an internal combustion engine as set forth in claim 7, wherein the engine includes a throttle valve, the system further including a throttle sensor for sensing the opening of the throttle valve and the rate of change of said opening and providing respective signals thereof, said electronic control unit utilizing said opening signal and said rate of change of opening signal to ascertain the occurrence of rapid acceleration of the engine.

* * * * *